(12) United States Patent
Glock

(10) Patent No.: US 10,504,345 B2
(45) Date of Patent: Dec. 10, 2019

(54) SURVEILLANCE CAMERA, SYSTEM HAVING A SURVEILLANCE CAMERA AND METHOD FOR OPERATING A SURVEILLANCE CAMERA

(71) Applicant: Christian Glock, Bochum (DE)

(72) Inventor: Christian Glock, Bochum (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 15/869,980

(22) Filed: Jan. 12, 2018

(65) Prior Publication Data

US 2018/0158297 A1 Jun. 7, 2018

Related U.S. Application Data

(63) Continuation of application No. PCT/EP2016/066502, filed on Jul. 12, 2016.

(30) Foreign Application Priority Data

Jul. 20, 2015 (DE) .................. 10 2015 111 728

(51) Int. Cl.
  *H04N 7/18* (2006.01)
  *G08B 13/196* (2006.01)
  *H04N 5/232* (2006.01)

(52) U.S. Cl.
  CPC ..... *G08B 13/1963* (2013.01); *G08B 13/1966* (2013.01); *G08B 13/19656* (2013.01); *H04N 5/232* (2013.01); *H04N 5/23206* (2013.01); *H04N 5/23296* (2013.01); *H04N 7/183* (2013.01)

(58) Field of Classification Search
  CPC . H04N 5/76; G02B 7/28; G03B 15/05; G07G 3/00; G06K 7/008; G08B 13/1963; G08B 13/19656
  USPC ............. 396/105, 157; 386/217; 235/462.23; 348/150
  See application file for complete search history.

(56) References Cited

U.S. PATENT DOCUMENTS

| 4,337,482 | A | * | 6/1982 | Coutta | G07G 3/00 348/150 |
| 4,799,077 | A | * | 1/1989 | Kaplan | G02B 7/28 396/105 |
| 5,794,076 | A | * | 8/1998 | Farrington | G03B 15/05 396/157 |
| 2002/0191952 | A1 | * | 12/2002 | Fiore | H04N 5/76 386/217 |

(Continued)

FOREIGN PATENT DOCUMENTS

WO WO 2008/064270 A2 5/2008

*Primary Examiner* — Gims S Philippe
(74) *Attorney, Agent, or Firm* — Reinhart Boerner Van Deuren P.C.

(57) ABSTRACT

Provided are embodiments of a surveillance camera. The surveillance camera includes an optical sensor and an actuation drive which is configured to adjust a viewing field of the optical sensor in such a manner that the viewing field can be adjusted respectively at least into a surveillance range and an inactive range. The inactive range is at least partially spatially disjoint from the surveillance range. Security from external surveillance is ensured in that the actuation drive adjusts the viewing field in accordance with an external actuation signal between the surveillance range and the inactive range.

13 Claims, 4 Drawing Sheets

(56) References Cited

U.S. PATENT DOCUMENTS

| | | |
|---|---|---|
| 2004/0118926 A1* | 6/2004 | Yavid .................. G06K 7/0008 235/462.23 |
| 2004/0223191 A1 | 11/2004 | Murata et al. |
| 2005/0111660 A1 | 5/2005 | Hosoda |
| 2011/0134243 A1 | 6/2011 | Siann et al. |
| 2012/0013744 A1 | 1/2012 | Piel et al. |
| 2014/0037283 A1 | 2/2014 | Cury |
| 2014/0301729 A1 | 10/2014 | Okamura et al. |
| 2015/0281548 A1 | 10/2015 | Yang |

* cited by examiner

SURVEILLANCE CAMERA, SYSTEM HAVING A SURVEILLANCE CAMERA AND METHOD FOR OPERATING A SURVEILLANCE CAMERA

CROSS-REFERENCE TO RELATED PATENT APPLICATIONS

This patent application is a continuation of PCT/EP2016/066502, filed Jul. 12, 2016, which claims priority to German Application No. 10 2015 111 728.2, filed Jul. 20, 2015, the entire teachings and disclosure of which are incorporated herein by reference thereto.

FIELD OF INVENTION

The subject matter includes a surveillance camera, a system, in particular a home automation system, having a surveillance camera and a method for operating a surveillance camera.

BACKGROUND OF INVENTION

Surveillance cameras are currently used not only in public and semi-public areas, which relate to safety-relevant areas, but also in the domestic environment. In particular, surveillance cameras for home users are known which carry out an internal space surveillance. External space surveillance cameras are also known. Both types of surveillance cameras generally have an optical sensor, often a CCD sensor (Charge Coupled Device) via which a moving image of a surveillance range can be detected. Surveillance cameras may continuously or in specific time periods detect moving images or individual images in short sequences. It is also known for surveillance cameras to be provided with movement sensors. In this instance, the surveillance cameras can be activated by their movement sensor and consequently record image sequences or moving images for a defined time period.

When surveillance cameras are used in an inside space, however, there is always the uneasy feeling with home users that external surveillance could take place. In particular in recent times, cyber attacks have become known in which cameras of computers which are actually intended to be used for video telephony have been manipulated via the internet by external third parties in such a manner that the user could be observed over the internet without his knowledge.

This and other reports have led to the fact that, in the field of home users, there is considerable scepticism with regard to internal space surveillance with cameras. In particular when the surveillance cameras are incorporated in a home network which is, for example, also connected to the internet, for example, via W-LAN or LAN, there is the latent danger that such surveillance cameras can be "captured" by third parties and external surveillance can take place without the user being aware.

Based on these considerations, the objective was to ensure the possibility of inside space surveillance with a camera in which at the same time external surveillance is practically excluded.

BRIEF SUMMARY OF THE INVENTION

This object is achieved, according to the subject-matter, by a surveillance camera according to embodiments disclosed herein, a system according to embodiments disclosed herein, and a method according to embodiments disclosed herein.

It has been recognised that software-based protection from attacks on surveillance cameras can almost always be attacked. If the camera is connected to a data network, there is not 100% protection against such a software-controlled camera being manipulated externally by third parties. Based on this knowledge, there is provided, according to the subject-matter, a hardware-based solution in which the surveillance camera is moved by means of an actuation drive if necessary between a surveillance range and an inactive range.

Thereby, the surveillance camera has an optical sensor. The optical sensor may in this instance, for example, be an CCD sensor. CMOS sensors can also be used. The optical sensor generally has a lens optical system in order to concentrate the viewing field of the surveillance camera on the optical sensor.

Furthermore, the surveillance camera has an actuation drive, in particular a motorised actuation drive. Such actuation drives are, for example, known in Pan-Tilt-Zoom (PTZ) cameras. By means of the actuation drives, both the horizontal and the vertical axis of the camera can be changed. Consequently, the actuation drive enables the camera to be adjusted in such a manner that the viewing field of the optical sensor changes. With the surveillance camera, according to the subject-matter, two ranges of the viewing field are defined. On the one hand, a surveillance range is defined. The viewing field of the optical sensor can be adjusted in such a manner that it covers an entire surveillance range. The surveillance range is generally the range which is intended to be monitored using the surveillance camera. In particular, access to the image which has been detected in the surveillance range from a remote position, for example, via a data network, is intended to be enabled. Remote surveillance of an object, a space or the like is thereby intended to be enabled.

On the other hand, the invention now proposes an inactive range which is spatially disjoint at least in portions from the surveillance range. The optical viewing field of the sensor in the surveillance range preferably does not spatially intersect with the optical viewing field of the sensor in the inactive range. In particular, the inactive range is spatially completely different from the surveillance range. However, it is also possible for an intersection to form between the surveillance range and inactive range.

The surveillance range and the inactive range can be determined by the user. The inactive range is preferably pivoted through at least 90°, in particular between 90° and 180° preferably about the vertical axis and/or the horizontal axis with respect to the surveillance range. This means that the optical axis of the sensor during adjustment from the surveillance range into the inactive range is pivoted through at least 90°, but preferably through up to 180°. The inactive range preferably faces away from the surveillance range. In particular with surveillance cameras which are arranged in corners of rooms or walls, the inactive range is such that the viewing field faces in the direction of the wall and the surveillance range is such that the viewing field faces in the direction of the room. In particular, the inactive range is limited to the wall which is closest to the surveillance camera at the installation location.

In order to both enable surveillance under specific conditions and to provide the user with the security that he cannot be monitored in specific situations, it is proposed that the actuation drive in accordance with an external actuation signal adjusts the viewing field between the surveillance range and the inactive range. That is to say that there may be provided an actuation signal dependent on which the actuation drive adjusts the optical sensor in such a manner that the viewing field thereof covers the surveillance range. This actuation signal can be used to configure the surveillance camera for a surveillance situation. At times at which the user is, for example, at home, such a surveillance by means of the surveillance camera is not necessary or not desirable and in this instance the actuation drive can be influenced by an actuation signal in such a manner that the viewing field of the camera comprises the inactive range. Consequently, only the inactive range is recorded by the optical sensor and recordings of the user moving in the surveillance range are consequently impossible.

According to an embodiment, it is possible for the surveillance camera to have a sensor which directly detects the external actuation signal. In particular this may be an acoustic sensor, for example, in the form of a microphone. Consequently, the surveillance camera may independently detect the external actuation signal. In this instance, the external actuation signal may consequently be an acoustic signal which is provided by the user himself. Depending on this actuation signal, the actuation drive can then be activated in order to adjust the viewing field between the surveillance range and the inactive range. In the event that the surveillance camera detects this acoustic external actuation signal itself, however, it is necessary for the surveillance camera to have to constantly monitor the arrival of the acoustic actuation signal, for example, by means of an acoustic sensor, such as, for example, an active microphone. There then remains the problem that permanent surveillance takes place, just no longer by means of the optical sensor, but instead by means of an acoustic sensor.

On the other hand, it is also possible according to an embodiment for the surveillance camera to have receiving means which receive the external actuation signal from a computer which is spatially separated from the surveillance camera. Using the receiving means, it is possible for the surveillance camera to be connected to a data network, for example, a W-LAN, a LAN or another data network and to be able to thereby receive the external actuation signal. The corresponding receiving means are configured in the surveillance camera to receive signals from the data network.

According to an embodiment, it is proposed that the receiving means be configured for receiving signals of a home automation system. In particular, the receiving means may be configured to receive, for example, signals in accordance with the Smarthome protocol of the Applicant, in accordance with the ZigBee standard, in accordance with a LON protocol, in accordance with an EIB/KNX protocol or the like.

It is also possible for the receiving means to be configured for communication via an internet protocol. So called IP cameras are known and have receiving or communication means for communication via an IP-based network. Preferably, the receiving means can receive UDP data packets in which the actuation signals are encoded.

As mentioned, the surveillance camera may be a PTZ camera. According to an embodiment, it is proposed that the actuation drive rotate the optical sensor about at least one axis. This may, for example, be the vertical and/or the horizontal axis. By rotating the optical sensor about an axis, the viewing field is changed, in particular from the surveillance range into the inactive range and back.

According to an embodiment, it is proposed that a position of the actuation drive for obtaining the surveillance range can be parameterised. A position of the actuation drive for obtaining the inactive range may also be able to be parameterised. This means that the angular position of the actuation drive may be able to be parameterised, at which angular position the viewing field of the optical sensor covers either the surveillance range or the inactive range. In order to parameterise the position of the actuation drive, a user interface can be used. In particular it is possible to control all the associations and parameters of the surveillance camera by means of a graphic user interface. In this instance, mobile computers, for example, mobile communication devices are particularly suitable. By means of the user interface thereof, it is possible to control the actuation drive of the surveillance camera and at a specific position to associate this with either the surveillance range or the inactive range. In particular, a coupling of the surveillance camera to the communication device can be carried out by means of near-field communication, for example, Bluetooth.

According to an embodiment, it is proposed that the actuation drive adjust the viewing field into the surveillance range in accordance with an external actuation signal and that the actuation drive adjust the viewing field into the inactive range in accordance with a second external actuation signal which is different from the first actuation signal. It has been recognised that it is not only necessary to activate the inactive range. This is always necessary when the user desires no surveillance. However, it is also necessary for the viewing field to be adjusted from the inactive range into the surveillance range when specific peripheral conditions are met. Such peripheral conditions may be signalled by the first external actuation signal.

For example, this may be the absence of the user from the room, the house or building in which the surveillance camera is configured. The spatial distance of a user with respect to the surveillance camera can also be used. To this end, for example, the mobile communication device of the user can be used in order to monitor the spatial distance thereof with respect to the surveillance camera and, when a minimum distance has been exceeded, the external actuation signal can be generated. Switches or buttons may also be provided by means of which the first and/or the second actuation signal can be activated.

In order to provide the user with the possibility of perceiving that the viewing field of the optical sensor changes or the viewing field is changed by means of the actuation drive, it is proposed according to an embodiment that signalling means optically and/or acoustically signal an activation of the actuation drive in response to the actuation signal. This may, for example, be the case by means of activation of an illumination means, for example, an LED, which illuminates when, for example, the viewing range is adjusted from the inactive range to the surveillance range. A permanent illumination, for example, an LED in a specific colour, for example, green, may also signal that the inactive range is adjusted. On the other hand, the active range may be signalled by a different colour of an illumination means.

A signal can also be output, for example, via a loudspeaker when the viewing range is adjusted from the inactive range into the surveillance range. The same can also naturally be carried out with a transposed adjustment from the surveillance range into the inactive range.

Another aspect is a system, in particular a home automation system, with an above-described surveillance camera and a central control unit. A central control unit of a home automation system can be configured to control actuators and sensors of the home automation system and to receive the signals thereof and to transmit signals thereto. These signals may naturally also include the external actuation signals which can be transmitted via the home automation system and where applicable via a gateway into a home network to a surveillance camera.

According to the subject-matter, the central control unit is configured to receive sensor signals from at least one sensor. Sensors may be of different types, for example, switches or buttons, motion detectors, smoke detectors, broken glass detectors, mobile communication devices, thermostats, proximity sensors, opening sensors, or the like. All such sensors may either be incorporated directly in the home automation system and communicate directly with the central control unit or indirectly by means of a corresponding gateway. Using the gateway, the sensor signals from a first communication network can be converted into the protocol of the home automation system.

Within the central control unit, almost any sensor signals may be associated with actuators. According to the subject-matter, it is proposed that the central control unit be configured to associate at least one of the sensor signals with an actuation signal for the surveillance camera. Consequently, it is possible within the central control unit to parameterise which actuation signal is intended to be actuated by a sensor signal. Such an actuation signal may, on the one hand, be the one with which the actuation drive is activated in order to adjust the viewing field into the surveillance range or also the actuation signal by means of which the actuation drive is activated in such a manner that the viewing field is adjusted into the inactive range. Consequently, a wide variety of associations of sensor signals with the adjustment of the surveillance camera into the surveillance range or the inactive range can be parameterised.

The home automation system or the central control unit is also configured in such a manner that, in accordance with the association when receiving a sensor signal of at least one sensor, it transmits the respective actuation signal to the surveillance camera. Consequently, when a sensor signal is received, it is verified in the central control unit whether an actuation signal is associated with this sensor signal and, where applicable, this actuation signal is then transmitted to the surveillance camera.

According to an embodiment, it is proposed that at least a first actuation signal for controlling the actuation drive be configured in such a manner that the actuation drive adjusts the viewing field into the surveillance range. Another second actuation signal which is preferably different from the first actuation signal for controlling the actuation drive can be configured in such a manner that the actuation drive adjusts the viewing field into the inactive range. Consequently, by means of two different actuation signals, it is possible to control the actuation drive in such a manner that the viewing field is adjusted either into the inactive range or into the surveillance range. The actuation signal may also be identical and, when the actuation signal is received respectively, the viewing field is changed between the inactive range and surveillance range.

As already mentioned, different sensor signals can act as triggers for the adjustment of the viewing field into the inactive range or the surveillance range. It is advantageous, for example, that a sensor signal which signals that an alarm system has been armed is associated with an actuation signal and that in accordance with this actuation signal the actuation drive adjusts the viewing field into the surveillance range. In this instance, when the alarm system has been armed, in particular when a specific range of different arming ranges of the alarm system has been armed, the surveillance is activated by means of the surveillance camera by the viewing field thereof being adjusted into the surveillance range.

It is also possible, when an alarm system is disarmed, for no surveillance to be intended to be carried out at all. For this reason, it is proposed that a sensor signal which signals a disarming of an alarm system be associated with an actuation signal and that, in accordance with this actuation signal, the actuation drive adjust the viewing field into the inactive range. As soon as the alarm system is disarmed, the viewing field is adjusted from the surveillance range into the inactive range and the user does not have to fear that he will be monitored by the surveillance camera when present.

An absence recognition and a presence recognition are also possible. An absence recognition may, for example, be such that the central control unit monitors what time has elapsed since the last sensor signal which was actuated by a user was input. Users generally adjust, when they are present, switching positions of switches, activate buttons, change temperatures, open and close doors and windows, activate motion sensors and the like. Consequently, in the event of a longer absence of a sensor signal which could be triggered by a user, it can be concluded that a user is not present. When such an absence recognition is present, a sensor signal which signals an absence recognition may be associated with an actuation signal and, in accordance with this actuation signal, the actuation drive can adjust the viewing field into the surveillance range. Consequently, when an absence has been identified, either by the central control unit itself or by a separate absence recognition circuit, the viewing field will be adjusted into the surveillance range.

An absence recognition may also involve a spatial distance of a user interface, for example, of a mobile communication device from the central control unit being detected. In this instance, it is, for example, possible to define a spatial range around the central control unit within which the presence of a user will be assumed and, when the spatial distance of the user or the end device thereof from the central control unit increases beyond this limit range, an absence can be assumed. If a presence has been identified, a sensor signal which signals a presence will be associated with an actuation signal and, depending on this actuation signal, the actuation drive will adjust the viewing field into the inactive range.

As shown, different sensor signals are possible, by means of which there can be activated actuation signals which are associated either with the inactive range or the surveillance range. The examples mentioned are purely exemplary and are not intended to be understood to be limiting.

According to an embodiment, it is proposed that a position recognition output in accordance with a recognised coordinate of a mobile communication device and a comparison of the recognised coordinate with a coordinate range a sensor signal and that this sensor signal be associated with an actuation signal in which the actuation drive adjusts the viewing field into the surveillance range. Such a "Geofencing" enables the surveillance to be automatically activated when the user is spatially remote from the home automation system or the central control unit.

According to an embodiment, it is proposed that a mobile end user device be configured to enable an association of a sensor signal with an actuation signal. Via an application which is provided for this purpose, the end user device can enable the association of the sensor signals with the actuation signals, for example, by means of a graphic user interface.

It has previously been mentioned that a position of the actuation drive can be parameterised in order to obtain the surveillance range and a position of the actuation drive can be parameterised in obtain to detect the inactive range. Such a parameterisation may, for example, be carried out by means of a mobile communication device by means of which it is possible to define the surveillance range and the inactive range. By means of a graphic user control, it is possible, for example, for the actuation drive to be activated and the viewing field of the surveillance camera to be changed. The image of the surveillance camera can be displayed on the end user device and it can be subsequently defined that this image is intended to be associated with either the surveillance range or the inactive range. The corresponding position of the actuation drive is stored at this time and associated with the respective range so that subsequently an adjustment of the surveillance camera or the viewing field thereof into the surveillance range and the inactive range is possible by adjusting the actuation drive to the desired position.

Another aspect is a method for operating a surveillance camera with the steps adjusting a viewing field of an optical sensor of the surveillance camera in such a manner that the viewing field is adjusted respectively at least into a surveillance range and an inactive range which is least partially spatially disjoint from the surveillance range. It is proposed that in accordance with an external actuation signal the viewing field be adjusted between the surveillance range and the inactive range.

BRIEF DESCRIPTION OF THE SEVERAL VIEWS OF THE DRAWING

The subject matter is explained in greater detail below with reference to drawings which show embodiments. In the drawings show.

DETAILED DESCRIPTION OF THE INVENTION

Figure 1:
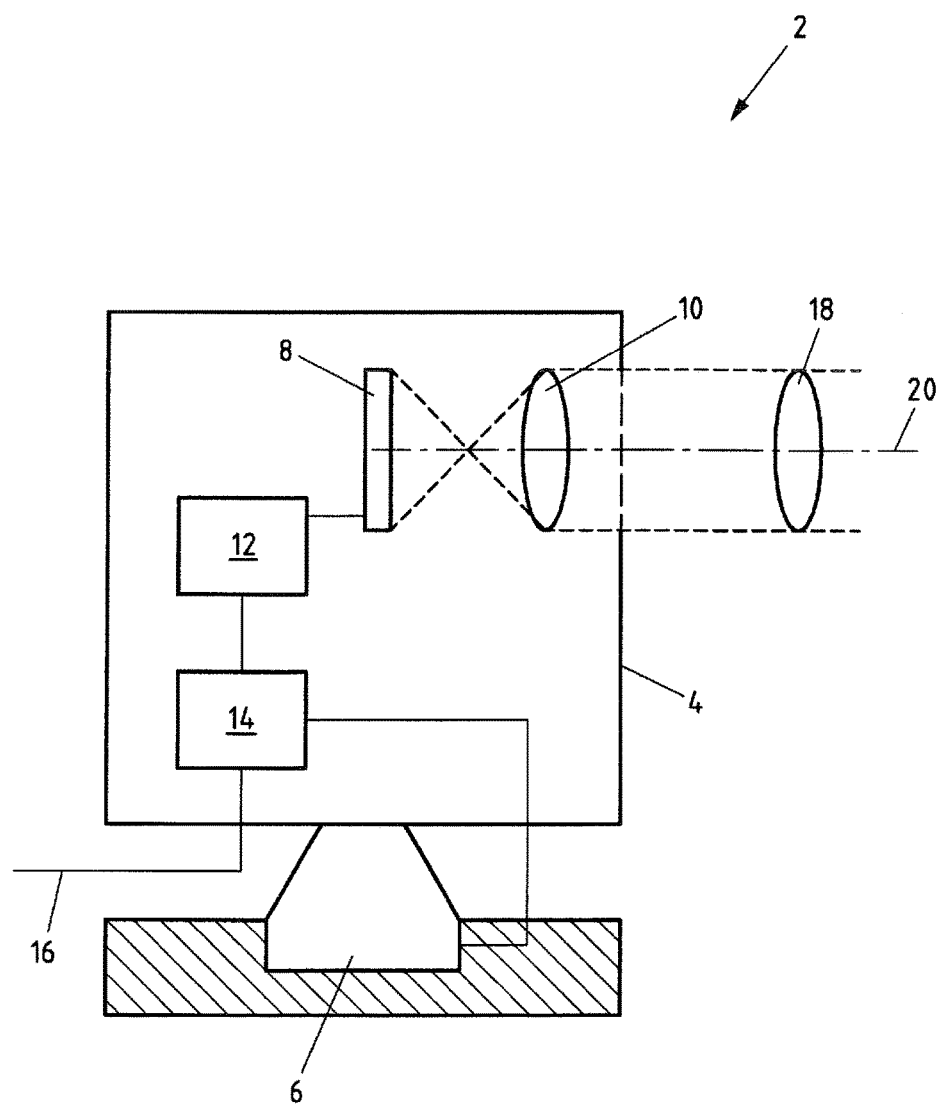
FIG. 1 shows an embodiment of a surveillance camera according to the subject-matter.

FIG. 1 shows a surveillance camera 2. The surveillance camera 2 has a housing 4. The housing 4 may also be in two parts.

An actuation drive 6 may be provided in the housing 4. The actuation drive 6 may be a motorised actuation drive. In particular, the actuation drive 6 may enable a rotation of at least part of the housing 4 in at least one, preferably two spatial directions. In particular, a rotation about a vertical axis and/or a horizontal axis may be enabled.

In the housing 4, there is provided an optical sensor 8 which can detect images from the environment of the surveillance camera 2 via a lens 10.

The optical sensor 8 is connected to an image processing processor 12 which converts the signals of the optical sensor 8 into image signals.

The image signals of the image processing processor 10 are transmitted to a central processor 14 in the housing 4.

The central processor 14 is connected via an interface to an external network 16, for example, an IP-based network. The central processor 14 further controls the actuation drive 6 via an internal control bus.

Additional components which are not illustrated here for reasons of simplicity may be installed in the surveillance camera 2.

Via the lens 10 and the optical system which is connected thereto and which comprises an optical sensor 8 and lens 10, a viewing field 18 results along an optical axis 20 of the optical sensor 8. The viewing field 18 is orientated in the direction of the optical axis 20 and is in accordance with the construction of the lens 10 and the spacing of the optical sensor 8 from the lens 10. It is significant that the viewing field 18 encloses a limited spatial angle and the optical sensor 8 can detect images of the space in this viewing field 18. Outside the viewing field 18, the surveillance camera 2 cannot detect any images with the optical sensor 8 thereof.

Figure 2:
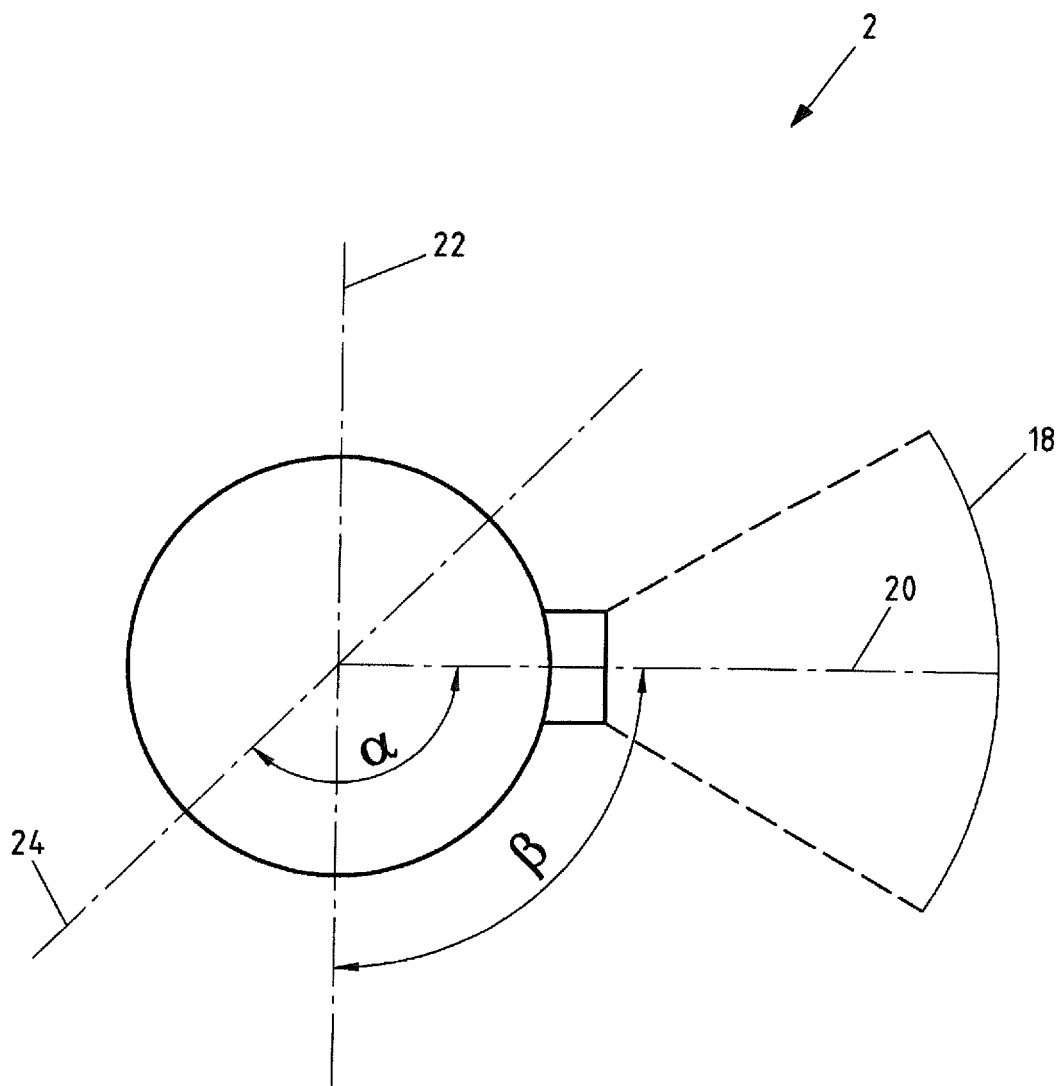
FIG. 2 shows a view of a surveillance camera.

As already mentioned in FIG. 1, the surveillance camera 2 can be rotated by means of the actuation drive 6 about at least two axes. This is illustrated in FIG. 2.

It can be seen that the optical axis 20 can be pivoted both about the vertical axis 22 as well as the horizontal axis 24. The pivoting of the optical axis 20 about the horizontal axis 24 is expressed by the angle $\alpha$. The pivoting of the optical axis 20 about the vertical axis 22 is initiated by the angle $\beta$. Generally, surveillance cameras 2 with suitable actuation drives 6 can be pivoted through at least $\alpha, \beta=180°$. By pivoting the optical axis 20 about an angle of at least 90°, preferably about an angle of approximately 180°, the optical axis 20 is changed in such a manner that the viewing field 18 changes significantly. With a suitably large angle $\alpha, \beta$, there can be adjusted viewing fields 18 which no longer intersect each other and which are consequently completely disjoint. Depending on how large the aperture of the optical system of the surveillance camera 2 is, the adjustment angle results produced in which the viewing fields 18 which are produced are disjoint. In particular, an adjustment through at least the aperture of the optical system is sufficient in order to achieve two disjoint viewing fields 18.

Figure 3:
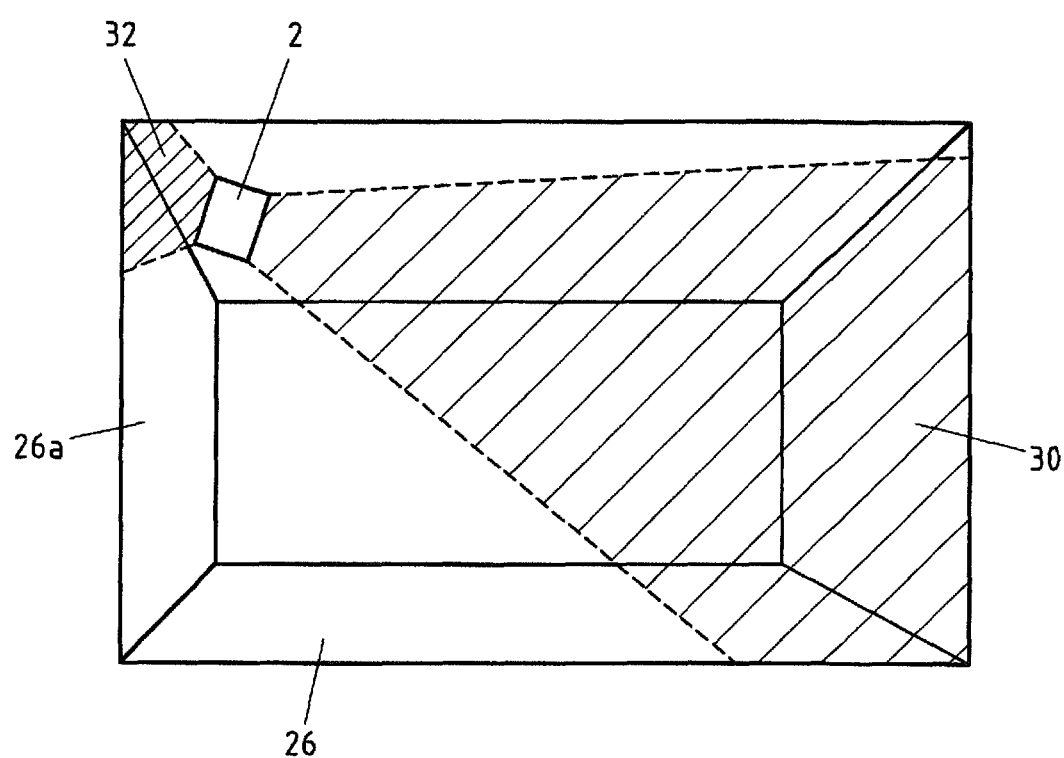
FIG. 3 shows a view of a space together with the surveillance range and inactive range.

The adjustment of the surveillance camera 2 with a surveillance range and an inactive range is illustrated in FIG. 3. FIG. 3 shows a space 26 which is intended to be monitored. In the space 26, in the region of a wall 26a, the surveillance camera 2 is preferably arranged in a room corner. FIG. 3 shows that the surveillance camera 2 can, on the one hand, be adjusted in such a manner that the viewing field 18 encloses a surveillance range 30. Preferably, the surveillance range 30 is orientated in the direction of the inside of the space. Furthermore, the actuation drive 6 of the surveillance camera 2 may change the optical axis 20 in such a manner that the viewing field 18 covers an inactive range 32. Preferably, the surveillance ranges 30 and inactive ranges 32 are viewing fields 18 facing away from each other.

In order to now provide the user with the possibility, under specific conditions and circumstances, of pivoting the surveillance camera 2 into the inactive range 32 and, on the other hand, under other conditions into the surveillance range 30, it is now proposed that the surveillance camera 2 can be adjusted in accordance with an external actuation signal. This external actuation signal can be directly detected by the surveillance camera 2 in which, for example, there is arranged on the surveillance camera 2 a microphone which detects a control command and this is evaluated by the central processor 14. Depending on the evaluation, the actuation drive 6 is then activated independently and the viewing field 18 of the surveillance camera 2 is pivoted from a surveillance range 30 into an inactive range 32 or vice versa.

Figure 4:
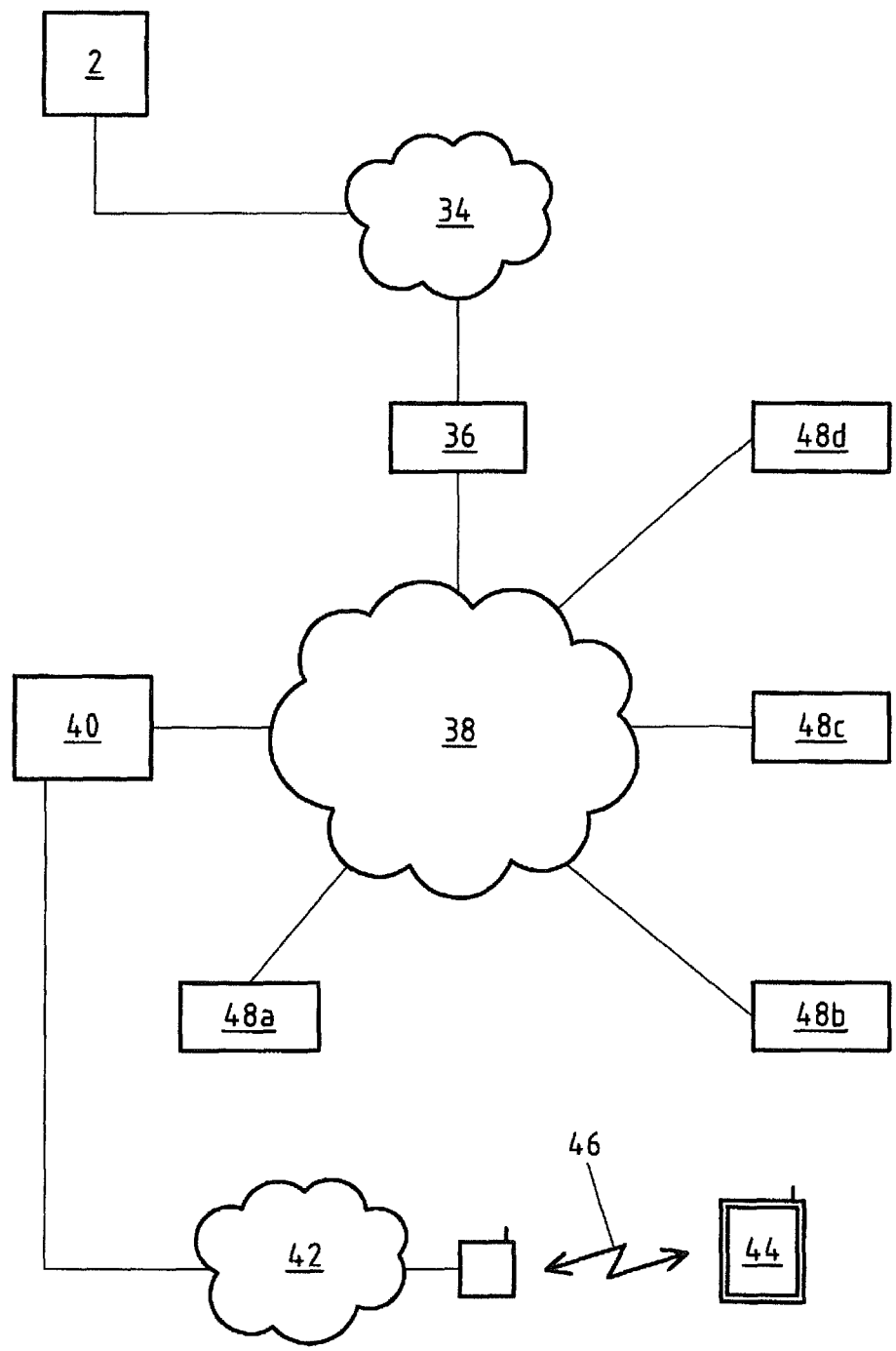
FIG. 4 shows a schematic illustration of a system according to the subject-matter.

It is also possible for the surveillance camera 2 to be incorporated in a home automation system, as illustrated in FIG. 4.

FIG. 4 shows the surveillance camera 2 which is, for example, a PTZ camera which is incorporated in an IP-based home network, for example, a LAN 34.

The home network 34 is connected to a home automation network 38 via a gateway 36. The home automation network 38 may be operated in accordance with the Smarthome protocol of the Applicant, the ZigBee protocol, the EIB protocol, the LON protocol or another home automation protocol. The gateway 36 converts commands from the home automation network 38 into commands for the home network 34 and vice versa. It is also possible for the surveillance camera 2 to be directly incorporated into the home automation network 38.

A central control unit 40 is connected to the home automation network 38. The home automation central control unit 40 controls the home automation network 38 in which signals from sensors are detected and signals for actuators are output and are transported via the home automation network 38.

The home automation central control unit 40 may, for example, also be an alarm central control unit. The home automation central control unit 40 is itself preferably connected via a wide-area network 42 to a mobile communication device 44. The communication device 44 may, for example, be a mobile telephone which is connected to the wide-area network 42 via a mobile radio network.

In the home automation network 38, various sensors 48a-d are provided. A first sensor 48a may, for example, be a switch or button. A second sensor 48b may, for example, be a motion detector. A third sensor 48c may, for example, be an alarm central control unit. Another sensor 48d may, for example, be a proximity sensor, for example, a door contact sensor or a window contact sensor. Other sensors are also possible.

The communication device 44 may also be used as an additional sensor of the home automation network 38. The user can also allow control commands to flow into the home automation network 38 via the communication device 44.

The sensor signals are all detected by the home automation central control unit 40 and depending on the respective associations converted into actuation signals which are transmitted via the home automation network to actuators.

With the method according to the subject-matter, a definition of the surveillance range 30 and the inactive range 32 is first carried out. To this end, the user can, for example, view via his communication device 44 the image detected by the surveillance camera 2. Via the communication device 44, the user can control the actuation drive 6 of the surveillance camera 2 and consequently change the optical axis 20 and the viewing field 18. Consequently, the user can, for example, adjust the surveillance camera 2 via the communication device 44 in such a manner that the viewing field 18 thereof covers the desired surveillance range 30. The user can then define via the communication device 44 the position of the actuation drive 6 at this time as the position which relates to the surveillance range 30. Furthermore, the user may adjust an inactive range 32 in accordance with the adjustment of the surveillance range 30 and accordingly associate the position of the actuation drive 6 with the inactive range 32. The surveillance range 30 and inactive range 32 are then defined and the respective position of the actuation drive 6 can be stored. This can be carried out either in the surveillance camera 2 or in the home automation central control unit 40.

The adjustment via the communication device 44 is only exemplary. It may also be carried out by means of a stationary computer in the home network 34 or directly at the central control unit 40.

After the inactive range 32 and surveillance range 30 have been defined, sensor signals can be associated with these ranges so that, when the corresponding sensor signals are received in the central control unit 40, the central control unit outputs actuation signals in order to pivot the surveillance camera 2 accordingly into the surveillance range 30 or into the inactive range 32.

For example, a sensor signal of the sensor 48b can be associated with an actuation signal for an inactive range. A user can, for example, enter the room and activate the sensor 48a, for example, by switching the light on. At this time, the surveillance of the room can be deactivated. This means that the central control unit 40 receives the sensor signal of the sensor 48a and establishes an appropriate association. As described, the association is such that the inactive range is intended to be adjusted with this sensor signal. Accordingly, an actuation signal which is provided for this purpose is transmitted from the central control unit 40 to the surveillance camera 2. In the surveillance camera 2, this actuation signal is evaluated by the processor 14 and the actuation drive 6 is instructed to assume the position which is allocated to the inactive range 32.

A corresponding association of a sensor signal with the inactive range can also be carried out with a sensor signal of the motion detector 48b. Even when the motion sensor 48b signals a movement, using a corresponding sensor signal the corresponding actuation signal can be output from the central control unit 40 in order to pivot the surveillance camera 2 into the inactive range 32.

The alarm central control unit 48c may, for example, monitor whether an arming signal or a disarming signal is present. If the alarm central control unit 48c is armed, it should be assumed that the user wishes to monitor the room 26. It is then possible to associate with the sensor signal "Arming" of the sensor 48c the actuation signal by means of which the surveillance camera is pivoted into the surveillance range 30. If the central control unit 40 receives a corresponding sensor signal, it transmits an actuation signal to the surveillance camera 2 and the actuation drive is driven by means of the processor 14 in such a manner that the surveillance camera 2 pivots into the surveillance range 30.

On the other hand, in the event of the alarm system 48c being disarmed, the inactive range 32 can be activated.

The alarm central control unit 48c may also act as a sensor for the "last human activity". In this instance, the alarm central control unit 48c may evaluate sensor signals in the home automation network and determine how long ago the last activity of a user which can be detected by means of a corresponding sensor signal was. If a specific minimum time has elapsed, it is, for example, possible for a sensor signal which requires the surveillance of the space 26 to be output. If this sensor signal is received, a corresponding association is stored in the central control unit 40 and the corresponding actuation signal is transmitted to the surveillance camera 2.

A presence detection may also take place, for which, for example, the sensor signals of the opening contacts 48d are evaluated. If all the opening contacts 48d are closed and, for example, no activity of the user can be determined, his absence can be concluded and a corresponding surveillance can be actuated by the corresponding actuation signal via the central control unit 40.

There is also not illustrated, for example, a smoke detector which is incorporated in the home automation network

38. When the smoke detector 38, for example, takes effect, it will supply a corresponding sensor signal to the home automation network 38. This sensor signal (fire alarm) can be received in the central control unit 40. Therein may be an association that this sensor signal is intended to lead to a surveillance of the space 26. In accordance with this association, the respective actuation signal is transmitted via the home automation network 38, the gateway 36 and the home network 34 to the surveillance camera 2. Therein, the actuation signal is evaluated by means of the central processor 14 and the actuation drive 6 is driven accordingly in order to pivot the viewing field 18 of the surveillance camera 2 into the surveillance range 30.

Using the system shown, it is possible to carry out a wide variety of configurations by means of which the viewing field of a surveillance camera 2 can be pivoted into a surveillance range 30 or an inactive range 32. Concern regarding permanent surveillance with a surveillance camera 2 can thereby be counteracted. Users can be sure that they are not constantly being monitored by the surveillance camera 2 since it monitors only an inactive range 32 under desired conditions.

It should be noted that the surveillance camera 2 does not always have to be switched on. It is sufficient for the surveillance camera 2 to be pivoted with the viewing field 18 thereof into the inactive range 32 without it being active. However, the user then knows that surveillance is not possible since the viewing field 18 is applied by him and even in the event of an attack on the surveillance camera 2 by third parties he cannot be monitored.

LIST OF REFERENCE NUMERALS

2 Surveillance camera
4 Housing
6 Actuation drive
8 Optical sensor
10 Lens
12 Image processing processor
14 Central processor
18 Viewing field
20 Optical axis
22 Vertical axis
24 Horizontal axis
26 Space
26a Wall
30 Surveillance range
32 Inactive range
34 Home network
36 Gateway
38 Home automation network
40 Home automation central control unit
42 Wide-area network
44 End device
46 Mobile radio network
48a Switch
48b Motion detector
48c Alarm central control unit
48b Opening contact All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A surveillance camera, comprising:
an optical sensor;
an actuation drive which is configured to adjust a viewing field of the optical sensor in such a manner that the viewing field can be adjusted respectively at least into a surveillance range and an inactive range which is at least partially spatially disjoint from the surveillance range;
wherein the actuation drive adjusts the viewing field in accordance with an external actuation signal between the surveillance range and the inactive range; and
wherein a position of the actuation drive for detecting the surveillance range and a position of the actuation drive for detecting the inactive range can be parameterised by a user.

2. The surveillance camera of claim 1, wherein the surveillance camera has a sensor which directly detects the external actuation signal.

3. The surveillance camera of claim 2, wherein the receiving means are configured for receiving signals of a home automation system.

4. The surveillance camera of claim 1, wherein the surveillance camera has receiving means which receive the external actuation signal from a computer which is spatially separated from the surveillance camera.

5. The surveillance camera of claim 1, wherein the receiving means are configured to communicate via an IP protocol.

6. The surveillance camera of claim 1, wherein the actuation drive adjusts the viewing field into the surveillance range in accordance with a first external actuation signal and in that the actuation drive adjusts the viewing field into the inactive range in accordance with a second external actuation signal which is different from the first actuation signal.

7. The surveillance camera of claim 1, wherein the signalling means optically and/or acoustically signal an activation of the actuation drive in response to the actuation signal.

8. A system, comprising:
a surveillance camera according to claim 1; and
a central control unit;
wherein the central control unit is configured to receive sensor signals from at least one sensor;
wherein the central control unit is configured to associate at least one of the sensor signals with an actuation signal for the surveillance camera;
wherein the central control unit transmits the respective actuation signal to the surveillance camera in accordance with the association when receiving a sensor signal of at least one sensor; and
wherein a position of the actuation drive for detecting the surveillance range and a position of the actuation drive for detecting the inactive range can be parameterised by a user.

9. The system of claim 8, wherein at least a first actuation signal for controlling the actuation drive is configured in such a manner that the actuation drive adjusts the viewing field into the surveillance range and/or in that at least a second actuation signal for controlling the actuation drive is configured in such a manner that the actuation drive adjusts the viewing field into the inactive range.

10. A system, comprising:
a surveillance camera, comprising:
an optical sensor;
an actuation drive which is configured to adjust a viewing field of the optical sensor in such a manner that the viewing field can be adjusted respectively at least into a surveillance range and an inactive range which is at least partially spatially disjoint from the surveillance range;
wherein the actuation drive adjusts the viewing field in accordance with an external actuation signal between the surveillance range and the inactive range; and
wherein a position of the actuation drive for detecting the surveillance range and a position of the actuation drive for detecting the inactive range can be parameterised by a user; and
a central control unit;
wherein the central control unit is configured to receive sensor signals from at least one sensor;
wherein the central control unit is configured to associate at least one of the sensor signals with an actuation signal for the surveillance camera;
wherein the central control unit transmits the respective actuation signal to the surveillance camera in accordance with the association when receiving a sensor signal of at least one sensor; and
wherein a position of the actuation drive for detecting the surveillance range and a position of the actuation drive for detecting the inactive range can be parameterised by a user;
wherein a sensor signal which signals an arming of an alarm system is associated with an actuation signal and in that in accordance with this actuation signal the actuation drive adjusts the viewing field into the surveillance range and/or in that a sensor signal which signals a disarming of an alarm system is associated with an actuation signal and in that in accordance with this actuation signal the actuation drive adjusts the viewing field into the inactive range and/or in that a sensor signal which signals an absence recognition is associated with an actuation signal, and in that in accordance with this actuation signal the actuation drive adjusts the viewing field into the surveillance range and/or in that a sensor signal which signals a presence recognition is associated with an actuation signal and in that in accordance with this actuation signal the actuation drive adjusts the viewing field into the inactive range.

11. The system of claim 8, wherein a position recognition in accordance with a recognised coordinate of an end user device and a comparison of the recognised coordinate with a coordinate range outputs a sensor signal and in that this sensor signal is associated with an actuation signal in which the actuation drive adjusts the viewing field into the surveillance range.

12. The system of claim 8, wherein a mobile end user device is configured to enable an association of a sensor signal with an actuation signal and/or a mobile end user device is configured to enable a definition of the surveillance range and the inactive range.

13. A method for operating a surveillance camera, comprising:
adjusting a viewing field of an optical sensor of the surveillance camera in such a manner that the viewing field is adjusted respectively at least into a surveillance range and an inactive range which is at least partially spatially disjoint from the surveillance range;
wherein, in accordance with an external actuation signal, the viewing field is adjusted between the surveillance range and the inactive range; and
wherein a position of the actuation drive for detecting the surveillance range and a position of the actuation drive for detecting the inactive range can be parameterised by a user.

* * * * *